UNITED STATES PATENT OFFICE.

JEAN M. CANELLOPOULOS, OF PARIS, FRANCE.

SELF-IGNITING SUBSTANCE.

SPECIFICATION forming part of Letters Patent No. 599,221, dated February 15, 1898.

Application filed March 9, 1897. Serial No. 626,655. (No specimens.) Patented in Luxemburg December 17, 1896, No. 2,698.

*To all whom it may concern:*

Be it known that I, JEAN M. CANELLOPOULOS, a subject of the King of Greece, residing at Paris, in the Republic of France, have invented certain new and useful Improvements in Self-Igniting Substances, (for which Letters Patent have been obtained in Luxemburg, No. 2,698, dated December 17, 1896;) and I do hereby declare the following to be a full, clear, and exact description of the invention, such as will enable others skilled in the art to which it appertains to make and use the same.

As is well known, certain substances possess catalytic properties to such a degree as to become intensely heated when exposed to a jet of gas of normal temperature, which properties have been utilized as a means for automatically igniting a jet of combustible gas. This property is possessed by carbon when prepared in a peculiar manner and under peculiar conditions. As is well known, some of the metals of the platinum group likewise possess catalytic properties to a very high degree. This is especially true of platinum sponge or black, both of which have been used as a means for igniting illuminating-gas. Both forms of this metal possess, however, well-known disadvantages, the principal one of which is that they gradually coalesce or slag under the action of the self-generated heat and gradually lose their catalytic properties and become useless in a comparatively short time. To remedy this disadvantage, it has been proposed to mix the platinum black or sponge in a finely-divided state with a non-catalytic carrier or to deposit in the pores of a non-catalytic porous body a salt of platinum and then to convert the latter into black by chemical reaction. Although better results may have been obtained, yet the platinum either in the form of black or in the form of sponge under the action of heat becomes gradually denser and gradually loses its catalytic properties, because the whole of the heat necessary to bring the inert carrier to a state of incandescence is derived from the catalytic metal. I have, however, discovered that other substances possess catalytic properties, although insufficient to become of themselves heated to a state of incandescence, yet sufficient to very materially assist the catalytic metal when mixed therewith to generate the heat required to bring the carrier to a state of incandescence, thus materially prolonging the duration of efficiency of a self-igniter made from such a substance and mixed with a catalytic metal, as platinum-black, in that the latter is not exclusively depended upon to furnish the heat required to heat the carrier to a state of incandescence, a great proportion of this heat being generated in the carrier itself.

I have found that combinations or compounds of salts of magnesium possess catalytic properties to a very high degree. This is especially the case in a compound or composition of silicate and carbonate of magnesium—*i. e.*, artificial meerschaum—or of silicate and oxid of magnesium, (magnesia,) while the silicate itself (natural meerschaum) is devoid of catalytic properties.

In carrying out my invention I take, for example, equal parts of pulverized silicate and carbonate of magnesium and form therewith a stiff paste or dough by addition of a sufficient quantity of water, preferably distilled, from which paste or dough the igniters of any desired shape are formed by molding and then dried at a temperature of about 30° centigrade. I next prepare a solution of a salt of a metal of the platinum group, preferably a solution of palladium chlorid, in water in the proportion of about four parts of water to one of the chlorid and impregnate the igniters therewith one or more times, as may be found necessary, allowing the impregnated igniters to dry after each impregnation, after which the chlorid is reduced by means of hydrogen, which, combining with the chlorin of the palladium salt, forms hydrochloric acid under a simultaneous rise in temperature, thereby reducing the palladium salt, which is thus held in a finely-divided state by the catalytic carrier. The chlorids of other metals of the platinum group may be employed in the manner described and give satisfactory results, yet I have found that the best results are obtained with palladium chlorid. In this manner the heating of the igniter body by the condensation of the gas and the heating of the finely-divided metal of the platinum group contained in such body take place mutually and simultaneously and in such manner that a combustible gas is ignited thereby either directly or indirectly through the medium of a metal heated thereby to incandescence. To this end the igniter body may have embedded therein or otherwise connected therewith a thread or threads of wire of a metal of the platinum group in order to obtain a special incandescent body or point that will assist in the ignition of the gas.

Having thus described my invention, what I claim as new therein, and desire to secure by Letters Patent, is—

A self-igniter for gas-burners composed of an intimate admixture of a catalytic metal, as palladium, with a catalytic carrier, consisting of magnesium carbonate and magnesium silicate, substantially as set forth.

In testimony that I claim the foregoing as my invention I have signed my name in presence of two subscribing witnesses.

JEAN M. CANELLOPOULOS.

Witnesses:
EDWARD P. MACLEAN,
DAVID T. S. FULLER.